United States Patent
Wang et al.

(10) Patent No.: US 9,417,370 B2
(45) Date of Patent: Aug. 16, 2016

(54) HIGHLY MISCIBLE POLYMER BLENDS AND USES THEREOF

(75) Inventors: Zhuo Wang, Shanghai (CN); Yong Wen Zhang, Shanghai (CN); Xiuqin Shi, Shanghai (CN)

(73) Assignee: Dow Global Technologies LLC

(*) Notice: Subject to any disclaimer, the term of this patent is extended or adjusted under 35 U.S.C. 154(b) by 0 days.

(21) Appl. No.: 14/406,082

(22) PCT Filed: Jun. 19, 2012

(86) PCT No.: PCT/CN2012/077149
§ 371 (c)(1),
(2), (4) Date: Dec. 5, 2014

(87) PCT Pub. No.: WO2013/189027
PCT Pub. Date: Dec. 27, 2013

(65) Prior Publication Data
US 2015/0116827 A1    Apr. 30, 2015

(51) Int. Cl.
| | |
|---|---|
| G02B 5/30 | (2006.01) |
| G02F 1/13363 | (2006.01) |
| G02B 1/04 | (2006.01) |
| B29C 55/02 | (2006.01) |
| C09D 101/28 | (2006.01) |
| C09D 183/06 | (2006.01) |
| C08L 83/06 | (2006.01) |
| G02B 1/10 | (2015.01) |
| C08G 77/14 | (2006.01) |
| B29K 1/00 | (2006.01) |
| B29K 83/00 | (2006.01) |
| B29L 11/00 | (2006.01) |

(52) U.S. Cl.
CPC .............. *G02B 5/305* (2013.01); *B29C 55/02* (2013.01); *C08L 83/06* (2013.01); *C09D 101/28* (2013.01); *C09D 183/06* (2013.01); *G02B 1/04* (2013.01); *G02B 5/3083* (2013.01); *G02F 1/13363* (2013.01); *B29K 2001/08* (2013.01); *B29K 2083/00* (2013.01); *B29L 2011/0066* (2013.01); *C08G 77/14* (2013.01); *G02B 1/105* (2013.01); *G02F 2001/133638* (2013.01); *Y10T 428/31663* (2015.04)

(58) Field of Classification Search
CPC ........ G02B 5/305; G02B 1/04; G02B 5/3083; G02B 1/105; G02F 1/13363; G02F 2001/133638; C08G 77/14; C08L 83/06; C09D 183/06; C09D 101/28; B29C 55/02; B29K 2001/08; B29K 2083/00; B29L 2011/0066
USPC ............ 359/487.02, 489.07; 349/96; 524/36, 524/506, 588, 771, 837, 838, 858, 860–866, 524/868, 869; 425/335–337; 106/141.1, 106/142.1, 143.1; 525/100–106, 158, 393, 525/431, 474–478, 487

See application file for complete search history.

(56) References Cited

U.S. PATENT DOCUMENTS

| | | | | |
|---|---|---|---|---|
| 3,290,417 | A * | 12/1966 | Halcoussis | C09D 157/04 525/100 |
| 5,260,109 | A * | 11/1993 | Iida | G02F 1/13363 252/299.01 |
| 8,974,627 | B2 * | 3/2015 | Schubert | C08B 15/05 156/329 |
| 2002/0192397 | A1 | 12/2002 | Tsujimoto | |
| 2004/0008304 | A1 * | 1/2004 | Nair | G02B 5/3083 349/117 |
| 2004/0044127 | A1 | 3/2004 | Okubo et al. | |
| 2005/0186360 | A1 | 8/2005 | Oya et al. | |
| 2005/0237462 | A1 * | 10/2005 | Nguyen | B82Y 20/00 349/130 |
| 2007/0116902 | A1 * | 5/2007 | Muramatsu | G02B 1/105 428/1.31 |
| 2007/0134442 | A1 * | 6/2007 | Matsunaga | G02B 5/3083 428/1.3 |

(Continued)

FOREIGN PATENT DOCUMENTS

| | | |
|---|---|---|
| JP | 2003096207 | 4/2003 |
| JP | 2007052079 | 3/2007 |

(Continued)

OTHER PUBLICATIONS

Express Polymer Letters, 2, No. 11, 2008, p. 829-834, Characterisation of silicone prepolymers and disparity in results, Shah.

(Continued)

*Primary Examiner* — Frank Font

(57) ABSTRACT

Compositions comprise a highly miscible polymer blend of at least one cellulose derivative and at least one polysiloxane additive of formula $[R^1R^2R^3SiO_{0.5}]_a[R^4R^5SiO]_b[R^6SiO_{1.5}]_c[SiO_2]_d$, wherein the substituents $R^1$, $R^2$, $R^3$, $R^4$, $R^5$ and $R^6$ each independently represents a hydrocarbon group or a functional group selected from a hydroxyl group, an acyloxy group or an alkoxy group, and may be the same or different from each other with respect to each individual silicon atom, and $0 \leq a \leq 0.4$, $0.01 \leq b \leq 0.99$, $0.01 \leq c \leq 0.99$, $0 \leq d \leq 0.3$, under the proviso that at least one hydrocarbon group and at least one functional group are present and $a+b+c+d=1$. Articles such as optical films comprising such a composition exhibit improved moisture barrier properties, reduced and adjustable out of plane retardation, adjustable glass transition temperature and provide for a facile generation of hydrophilic surface properties without considerable difference of the mechanical properties compared to corresponding articles of the pure cellulose derivative. A method to prepare such optical films, which can be particularly useful as retardation or protection films for polarizing plates in liquid crystal display devices, is also provided.

11 Claims, 1 Drawing Sheet

(56) References Cited

U.S. PATENT DOCUMENTS

| | | |
|---|---|---|
| 2007/0231505 A1 | 10/2007 | Taguchi |
| 2007/0276091 A1* | 11/2007 | Son .................. C09D 183/04 525/100 |
| 2008/0107829 A1 | 5/2008 | Oya et al. |
| 2008/0227881 A1 | 9/2008 | Watano et al. |
| 2009/0280271 A1 | 11/2009 | Sasada |
| 2010/0280161 A1 | 11/2010 | Abe et al. |

FOREIGN PATENT DOCUMENTS

| | | |
|---|---|---|
| JP | 2010126624 | 6/2010 |
| JP | 2011013435 | 1/2011 |
| JP | 2011112842 | 6/2011 |

OTHER PUBLICATIONS

Chiralty, 12, 2000, p. 670-674, Chiral Discrimination with Regioselectively Substituted Cellulose Esters as Chrial Stationary Phases, Kasuya et al.

J. Org. Chem., 54, 1973, p. 115-122, Si-NMR-Spektroskopische Untersuchungen an Methyl-und Methyl-Phenyl-Siloxanen and ihre Anwendung in der Silikonanalytik, Engelhardt.

High Perf. Poly. 22, 2010, p. 959-973, Synthesis and Characterization of a Silicone Resin with Silphenylene Units in Si—O—Si Backbones II, Chao-Bo Wu et al.

J. Appl. Poly. Science, 70, 1998, p. 1753-1757, Synthesis of MQ Silicone Resins, Huang et al.

Magnetic Res. in Chem., 40, 2002, p. 70-76, Modelling one- and two-dimensional solid-state NMR spectra, Massiot et al.

* cited by examiner

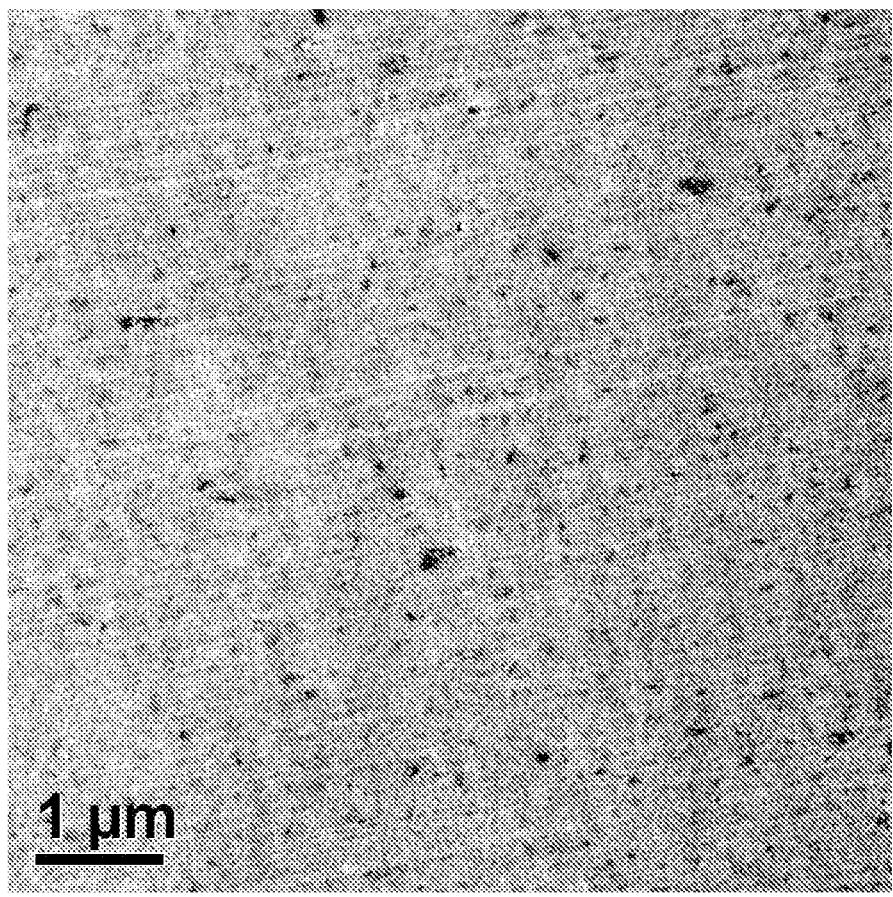

HIGHLY MISCIBLE POLYMER BLENDS AND USES THEREOF

FIELD OF THE INVENTION

The present invention relates to highly miscible polymer blends of cellulose derivatives and polysiloxane additives particularly useful for an effective preparation of articles such as optical films providing reduced and adjustable out of plane retardation, improved moisture barrier properties, low haze and/or hydrophilic surface properties, preferably without considerable changes to the mechanical properties versus films of the pure cellulose derivative. A method to prepare such optical films based on said blends and the use of such films in polarizing plates and liquid crystal display devices is also within the scope of the invention.

INTRODUCTION

Polarizing plates are critical components that determine the performance of liquid crystal displays (LCD), which are widely used in a variety of electronic devices. A polarizing plate typically comprises a polarizer and two protective optical films, one applied to each major surface of the polarizer. If such optical film has significant birefringence, it may alter the polarization state of a light wave traveling through it, thus being referred to as a retardation film instead of a mere protection film. A retardation film enhances the display quality in terms of expanding the viewing angle, providing high contrast and avoiding color shifts by optical compensation. Generally, the polarizer of a polarizing plate is made from a stretched polyvinyl alcohol (PVA) film doped with iodine or a dichromatic dye. PVA is sensitive to moisture as it undergoes water-mediated loss of iodine and as it absorbs moisture causing dimensional changes upon exposure to environments of different humidity level. Thus protection/retardation films which exhibit low moisture permeability are required to ensure dimensional stability and to prevent a degradation of the polarization characteristics. Cellulose acylate and in particular triacetyl cellulose (TAC) films are most frequently used as protection or retardation films since they provide comparatively low water vapor permeation rates (WVPR) in the range of typically 600-700 g/(m²·day) for an 80 μm thick film at 40° C. and 90% relative humidity in combination with high transparency and the ability to easily adjust an adequate adhesion to PVA by means of saponification. However, in view of the trend towards ever thinner polarizing plates and increasing demands to LCD reliability and performance under rugged environmental conditions including significant changes in temperature and/or humidity, e.g. upon outdoor use of electronic devices or in non-air conditioned environments, it is highly desirable to further reduce the water permeability of protection and retardation films. The persistent need to reduce the moisture permeability applies even more to cellulose ethers, which are interesting alternative materials to cellulose acylates for the production of protection and retardation films. In particular, ethyl cellulose films exhibit inferior moisture barrier properties compared with TAC, yielding water vapor permeation rates of 1,000-1,100 g/(m²·day) at 40° C., 90% RH for a 80 μm thick film. Such high moisture permeability is not acceptable for LCD applications, where WVPR values in the range of 400-900 g/(m²·day), preferably 400-700 g/(m²·day), at 40° C., 90% RH or lower are required. Thus the moisture permeability of cellulose ether films needs to be reduced to allow their use as optical film in polarizing plates.

From US 2002/0192397 A1 it is known that the moisture permeability of a cellulose acylate protection film can be reduced by addition of a conventional hydrophobic plasticizer such as triphenylphosphate or ethylphthalyl-ethylglycolate. Moreover, US 2007/0231505 A1 discloses that the moisture permeability of a 40-180 μm thick cellulose acylate retardation film can be adjusted to ≤700 g/(m²·day) at 40° C., 90% RH by addition of a retardation adjusting compound having at least two aromatic rings. However, such low molecular additives tend to bleed out as evidenced by US 2009/0280271 A1, which degrades the optical and mechanical film properties and increases moisture permeability on the long term.

US 2004/0044127 A1 discloses translucent organic-inorganic hybrid films formed by sol-gel reaction comprising a matrix of a cellulose ester or ether and a polycondensation product of a condensation polymerizable reactive metal compound such as alkoxysilanes having low moisture vapor permeability and high dimensional stability at a haze below 1%. The polycondensation products are highly cross-linked inorganic polymers with a structure and composition similar to the respective metal oxide such as $SiO_2$ and form particles of an average size in the range of 1 to 200 nm. However, dimensional stability and improved moisture barrier properties are only achieved if the film comprises as a third component 1-20 wt. % of a conventional plasticizer. Moreover, the inorganic polymer is not only found to increase the moisture barrier properties of the cellulosic film, but also to increase the out of plane retardation ($R_{th}$) at the same time. However, at least for cellulose ether films, it is on the contrary necessary to decrease $R_{th}$ since cellulose ether films of conventional thickness exhibit too high $R_{th}$, e.g. above 300 nm for 40-80 μm thick ethyl cellulose films, beyond the needs for retardation films in most current LCD applications such as 120-140 nm for VA-mode LCDs or <10 nm for IPS-mode LCDs. The out of plane retardation could in principle be reduced by decreasing the film thickness, however, this increases the complexity of the film manufacturing process and would necessarily increase the film moisture permeability. Thus other options to adjust the out of plane retardation of cellulosic optical films are sought after.

It is e.g. known from JP 2007/052079 A2 and JP 2011/112842 A2 that the birefringent characteristics of a retardation film can be controlled by blending a plurality of polymers having different individual birefringent properties. However, polymers are commonly poorly compatible with each other and tend to separate into distinct phases, limiting the applicability of the blending approach to the rare case of polymers with excellent miscibility for optical films, which require low haze and high transparency. Blending 100 parts by weight of a cellulose ether such as ethyl cellulose with 0.01 to 5 parts by weight of a silicone resin for the preparation of optical films is described in JP 2011/013435 A2. The silicone resin has hydrophobic alkyl substituents and hydrophilic polyester and/or polyether substituents and, optionally, reactive groups such as hydroxyl, carboxyl, amino or other functionalities to prevent bleeding, which is nevertheless reported to occur, if the silicone resin is added in an amount corresponding to more than 5 wt. % of the blend. Such silicone resin is used as a surface conditioner to provide adequate release characteristics for film preparation by solution casting, however, is not disclosed to allow for a reduction of $R_{th}$ or the moisture permeability of cellulose ether films. Moreover, the films prepared according to JP 2011/013435 A2 have a haze as high as 0.8% even at a low dosage of silicone release agent. However, films having a haze below 0.5% are preferable for the use as protective or retardation films in LCD applications.

Another issue for the application of cellulose ether based films as retardation or protection films resides in their lack of adhesion to the hydrophilic PVA-based polarizer commonly employed in polarizing plates due to the hydrophobic nature of cellulose ether materials, ethyl cellulose having for instance a water contact angle as high as 60-70°. Saponification treatment typically used to make the surface of cellulose acylate films suitably hydrophilic cannot be applied analogously to cellulose ether films. Hence, at least for ether derivatives of cellulose there remains a strong need to find an effective way of generating hydrophilic surface properties, i.e. to reduce the water contact angle to an adequate level for the combination with hydrophilic e.g. PVA-based components, typically requiring a water contact angle of about 20° or less.

Moreover, cellulosic optical films are conventionally prepared by solution casting. Usually the solid content in the dope is limited to 20 to 30 wt. % or less as the cellulose derivatives exhibit a pronounced increase of viscosity, which makes processing difficult, at higher loads. Typically, conventional dopes have a solid content in the range of 10 to 20 wt. %. Accordingly, relatively large amounts of organic solvent are consumed. It would be desirable to find a means of increasing the solid content in the dope solution without the expense of a significant viscosity increase in order to reduce the consumption of organic solvents in the film production, which would be advantageous from an economic and environmental perspective.

Consequently the objective of the present invention is to overcome at least some of the afore-mentioned deficiencies of the prior art, i.e. in particular to provide a composition, which allows to prepare long term stable, translucent, low haze cellulosic optical films with reduced, adjustable out of plane retardation, improved moisture barrier properties and/or readily achievable hydrophilic surface properties, and adequate mechanical properties, and other articles, in an efficient and cost-saving manner.

SUMMARY OF THE INVENTION

In a first aspect, the present invention thus relates to a composition comprising a miscible blend of:
a) at least one cellulose derivative, and
b) at least one polysiloxane of formula (I)

$$[R^1R^2R^3SiO_{0.5}]_a[R^4R^5SiO]_b[R^6SiO_{1.5}]_c[SiO_2]_d \quad (I)$$

wherein the substituents $R^1$, $R^2$, $R^3$, $R^4$, $R^5$ and $R^6$ each independently represent a hydrocarbon 110 group or a functional group selected from a hydroxyl group, an acyloxy group or an alkoxy group, and may be the same or different from each other with respect to each individual silicon atom, and $0 \le a \le 0.4$, $0.01 \le b \le 0.99$, $0.01 \le c \le 0.99$, $0 \le d \le 0.3$, under the proviso that at least one hydrocarbon group and at least one functional group are present and $a+b+c+d=1$.

In a second aspect, the present invention provides an article comprising the composition according to the invention in the form of a film, a sheet, a fiber, an extruded profile, a coated article, an injection molded article, a blow molded article, a rotational molded article or a pultruded article, preferably being an optical film.

The present invention also relates to a method of manufacturing an optical film comprising:
providing a solution comprising at least one cellulose derivative and at least one polysiloxane as set forth as components of the composition of the present invention, and a solvent,
casting said solution onto a support,
drying the cast film at least partially, and then, optionally,
stretching the film mechanically in at least one direction and/or
subjecting the film to a surface treatment.

In another aspect of the present invention, there is provided a polarizing plate comprising a polarizer and an optical film according to the invention provided on at least one side of the polarizer.

Furthermore, the present invention includes a liquid crystal display device comprising the polarizing plate according to the invention.

In another aspect, the present invention is related to the use of at least one polysiloxane as set forth as component of the composition according to the invention to reduce the moisture permeability and/or to reduce the out of plane retardation and/or to adjust the glass transition temperature of an optical film comprising at least one cellulose derivative and/or to reduce the water contact angle of such film by plasma treatment.

DESCRIPTION OF EMBODIMENTS

The inventors of the present invention have surprisingly found out by comprehensive studies that such polysiloxanes set forth as component of the composition according to the invention form highly miscible blends with cellulose derivatives such as cellulose ethers. In the context of the present invention the term "(highly) miscible" does not necessarily require the blend to be single phase on a molecular level or to fulfill the thermodynamic criterion of miscibility, i.e. to have a negative Gibbs free energy of mixing, although the blend may actually have these properties. However, within this invention "(highly) miscible" can also mean that the blend exhibits a single glass transition temperature as measured in accordance with ISO 11357-2 by differential scanning calorimetry (DSC) and/or exhibits no melting peak as measured by DSC in accordance with ISO 11357-3, and/or that an optical film comprising the composition according to the invention exhibits substantially the same or a lower haze measured according to ASTM D-1003 as an optical film of the same dimensions and composition except that it comprises no blend of the at least one polysiloxane and the at least one cellulose derivative, but the polysiloxane content being replaced by the at least one cellulose derivative. The term "substantially the same" refers to potential differences being in the range of the measurement uncertainty such as e.g. within a range of ±30%, ±10%, ±5%, ±2%, ±1% or ±0.5%. Preferably the blend is optically homogeneous in the visible spectral range. This means herein that discontinuous phase structures potentially present in the blend have a length in the longest dimension of 200 nm or less, preferably 100 nm or less, or more preferably 50 nm or less. The dimensions of discontinuous phase structures can be determined by transmission electron microscopy by means known in the art.

The polysiloxane additive can be used in amounts as high as up to 90 wt. % based on the total weight of solids of the composition without the occurrence of compatibility issues providing high transparency and low haze to articles such as films produced from the composition according to the invention. Furthermore, it was surprisingly found that the moisture barrier properties improve considerably and that the out of plane retardation is steadily reduced for such optical films with increasing content of the polysiloxane in the composition, typically without a considerable degradation of the mechanical properties. In particular, ethyl cellulose based films having a haze of 1.0% or less and a light transmittance of at least 85% as measured each by ASTM D-1003, a water vapor permeation rate of 900 g/(m²·day) or less as measured in accordance with ASTM F-1249 at 40° C. and 90% RH and normalized to a film thickness of 80 µm, and an out of plane retardation at a wavelength of 588 nm in the range of 0 to 1000 nm are thus feasible. Moreover, the presence of the polysiloxane additive in the composition also enabled an effective generation of hydrophilic surface properties by plasma treatment wherein water contact angles of 20° or less can be achieved more readily and in less time than by a conventional saponification treatment of cellulose acylate films. Due to the foregoing unique features, optical films can be produced from the compositions of the present invention, which are excellently suited as retardation or protection films for polarizing plates meeting the requirements in current LCD applications, without the need for low molecular additives that may cause long term stability issues due to bleeding or additional moisture barrier layers that increase processing complexity and costs. It was found that such films can be manufactured effectively by a solution casting method since addition of the at least one polysiloxane set forth above does not increase the viscosity of a dope solution of the at least one cellulose derivative significantly. Hence the present invention allows to use dope solutions in the film production with a high solids content such as for instance 25 to 30 wt. % or more, based on the total weight of the solution, increasing production efficiency and reducing the consumption of environmentally hazardous organic solvents as well as costs associated with solvent recovery during the film casting process.

Further features and advantages of the invention will be explained in detail below.

First the at least one polysiloxane component will be described more specifically.

The polysiloxane of formula (I) is characterized by molar fractions of the constituting tri-, di-, mono- and unsubstituted structural monomer units of respectively:

a being in a range from 0 to 0.4, preferably from 0 to 0.25, more preferably from to 0.1, most preferably from 0 to 0.05, b being in a range from 0.01 to 0.99, preferably from 0.1 to 0.95, more preferably from 0.3 to 0.9, most preferably from 0.45 to 0.8, c being in a range from 0.01 to 0.99, preferably from 0.05 to 0.95, more preferably from 0.1 to 0.75, most preferably from 0.2 to 0.55, and d being in a range from 0 to 0.3, preferably from 0 to 0.15, more preferably from 0 to 0.05, even more preferably from 0 to 0.01, under the proviso that a+b+c+d=1. In this context the number of substituents of a structural monomer unit is determined by the number of substituents $R^1$, $R^2$, $R^3$, $R^4$, $R^5$ and $R^6$ bound to the Si atom of the monomer unit. In a particularly preferred embodiment the polysiloxane comprises predominantly mono- and disubstituted structural monomer units. Thus (b+c) can for instance be in a range from 0.7 to 1, preferably 0.8 to 1, or more preferably 0.9 to 1, or most preferably 0.95 to 1. Preferably, the molar ratio of mono- to disubstituted structural monomer units, i.e. c/b, is moreover in a range from 5:1 to 1:10, preferably from 3:1 to 1:5, more preferably from 1:1 to 1:4. The molar fractions of the unsubstituted, mono-, di- and trifold substituted structural monomer units constituting the polysiloxane can e.g. be determined quantitatively by $^{29}$Si-NMR spectroscopy according to the procedure described in the Examples.

Preferably the polysiloxane has a branched molecular structure such as a linear polysiloxane backbone having pendant polysiloxane side chains, or a randomly cross-linked three dimensional network structure. Typically the polysiloxane is a solid at 23° C. and a pressure of 1 atm.

As set forth above, the polysiloxane comprises at least one hydrocarbon group. In a particular embodiment the hydrocarbon group can have 1 to 30 carbon atoms comprising one or more aliphatic and/or aromatic moieties, wherein the aliphatic moieties can be linear or branched, saturated or unsaturated. The at least one hydrocarbon group can for instance be selected from an alkyl, cycloalkyl, aryl or aralkyl group having 1 to 12 carbon atoms such as a methyl, ethyl, propyl, butyl, amyl, hexyl, heptyl, octyl, dodecyl, cyclopentyl, cyclohexyl, methylcyclohexyl, ethylcyclohexyl, phenyl, biphenyl, naphthyl, tolyl, benzyl, xylyl, cumyl, mesityl and ethylphenyl group, or a mixture of any of the foregoing. In a preferred embodiment the at least one hydrocarbon group is selected from a methyl, ethyl, propyl, butyl, amyl, hexyl or phenyl group or a mixture of any of the foregoing. In a particularly preferred embodiment the at least one hydrocarbon group is selected from an alkyl group having 1 to 4 carbon atoms and/or phenyl. In one especially preferable embodiment $C_1$-$C_4$ alkyl groups and phenyl groups are both present in the polysiloxane. The at least one hydrocarbon group can e.g. be selected from methyl and phenyl or from propyl and phenyl. If alkyl and phenyl substituents are both present, the molar ratio of alkyl to phenyl substituents preferably ranges from 1:10 to 10:1, or 1:5 to 5:1, or 1:3 to 3:1, or most preferably from 2:1 to 1:2.

Besides the at least one hydrocarbon group the polysiloxane comprises at least one Si-bound functional group selected from a hydroxyl, an acyloxy or an alkoxy group. Herein, acyloxy or alkoxy groups typically comprise 1 to 4 carbon atoms such as a formyl, acetyl, propionyl, butyryl, methoxy, ethoxy, propoxy or butoxy group. The polysiloxane can comprise more than one type of functional group or a single type of functional group. Preferably a single type of functional group is present, the at least one functional group being a hydroxyl group. In a particularly preferred embodiment the polysiloxane contains silicon-bound hydroxyl groups in an amount of 0.1 to 15 wt. %, preferably 0.5 to 10 wt. %, more preferably 1 to 8 wt. %, even more preferably 3 to 7 wt. %, based on the total weight of the polysiloxane. The content of hydroxyl groups may be determined by methods well known in the art, e.g. by titration following the procedure described in G. B. Shah, EXPRESS Polymer Letters 2(11) (2008), pp. 830-831.

Preferably, the at least one polysiloxane used according to the present invention has a weight average molecular weight ($M_w$) as measured by gel permeation chromatography using polystyrene standards according to the procedure set forth in the examples in a range from 1,000, preferably 1,500, to 300,000, or preferably to 100,000, or more preferably to 30,000, even more preferably to 10,000, or most preferably to 5,000 g/mol. The polydispersity ($M_w/M_n$) is preferably in a range from 1 to 5, more preferably 1.5 to 3.

The polysiloxanes described in the foregoing can be produced by hydrolytic polycondensation according to methods well known in the art from precursors of the formula $SiX_qR'_{4-q}$. Herein X represents a hydrolysable substituent such as a halogen, preferably chlorine, or an alkoxy or acyloxy group as specified above, the number of which (q) defines the functionality of the precursor being an integer in the range of 1 to 4, and R' represents a non-hydrolysable substituent, which can each individually be selected from a hydrocarbon group as specified above. Non-limiting examples of suitable tetrafunctional (Q) precursors are tetrachlorosilane, tetramethoxysilane, tetraethoxysilane or tetraacetylsilane. Trifunctional (T) precursors can be exemplified by methyltriethoxysilane, phenyltrimethoxysilane or ethyltrichlorosilane. Difunctional (D) precursors include e.g. dimethyldimethoxysilane, diphenyldiethoxysilane or phenylmethyldiethoxysilane. Monofunctional (M) precursors comprise e.g. phenyldimethylmethoxysilane or diphenylmethylchlorosilane. The relative amounts of M, D, T and Q-precursors used in the preparation and their substituents determine the structure of the obtained polysiloxane and will be selected by the skilled artisan in accordance with the targeted polysiloxane. Typically a mixture of precursors is hydrolyzed at temperatures up to 150° C. in the presence of an acid or alkaline catalyst and, optionally, an organic solvent. Thus at least a part of the hydrolysable substituents is hydrolyzed yielding silanol groups, whereof at least a part condense in the following forming siloxane bonds to eventually yield a polysiloxane. For details about the preparation by hydrolytic polycondensation it is referred e.g. to Ullmanns Encyklopadie der technischen Chemie, Verlag Chemie, 4$^{th}$ ed., vol. 21, pp. 511-541.

Commercially available polysiloxanes that can favorably be employed according to the present invention include for instance 217 Flake Resin, 220 Flake Resin, 233 Flake Resin, 249 Flake Resin, 255 Flake Resin or Z-6018, 3037 and 3074 Resin intermediates distributed by Dow Corning Corp. (Midland, Mich.), Silres® 603 or 605 available from Wacker Chemie AG or YR 3370 from Momentive Performance Materials Inc.

In the composition according to the present invention a mixture of two or more polysiloxanes or, preferably, a single polysiloxane can be present. The composition typically comprises the at least one polysiloxane in an amount in a range from 0.1, preferably from 5 wt. %, more preferably from 10 wt. %, to 90 wt. %, or preferably to 70 wt. %, based on the total weight of solids of the composition. In one embodiment the at least one polysiloxane is comprised in the composition in an amount ranging from 1 wt. %, preferably from 5 wt. %, more preferably from 10 wt. %, most preferably from 15 wt. %, to 60 wt. %, or preferably to 45 wt. %, or more preferably to 40 wt. %, or most preferably to 35 wt. %, based on the total weight of solids of the composition. In another embodiment, the at least one polysiloxane is comprised in the composition in an amount that ranges from 30 wt. %, or preferably from 50 wt. %, more preferably from 60 wt. %, to 90 wt. %, or preferably to 80 wt. %, or most preferably to 75 wt. %, based on the total weight of solids of the composition.

In addition to the at least one polysiloxane as specified above the composition of the present invention comprises at least one cellulose derivative. Generally, the cellulose derivative used in the present invention can be any cellulose derivative that yields a miscible blend with a polysiloxane of the above-mentioned type. Herein the term cellulose derivative refers to any compound that has a cellulose backbone, i.e. a structure of D-glucopyranose units connected by β-1,4-glycosidic bonding, which has been chemically modified by the introduction of pendant moieties not comprised in pure cellulose. The term "cellulosic" is used herein to relate to an object comprising such a cellulose derivative. In a preferred embodiment the pendant moieties not comprised in pure cellulose are introduced by etherification and/or esterification of at least a part of the hydroxyl groups at the 2-, 3- and/or 6-position of the glucopyranose repeating units. Correspondingly, the at least one cellulose derivative used according to the invention can comprise 1,4-β-glycosidically linked repeating units represented by formula (II)

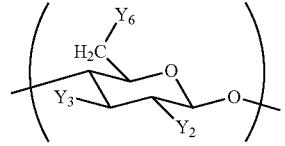

(II)

wherein $Y_2$, $Y_3$ and $Y_6$ each independently are selected from a hydroxyl group, —*OR", —*OC(O)R" and —*OM, wherein —*O designates an oxygen atom directly bound to a carbon atom at the 2-, 3- or 6-position of the repeating units, R" is an univalent organic group and M represents a moiety derived from an inorganic oxyacid by formal abstraction of an OH group, and may be the same or different from each other among the repeating units, under the proviso that at least a part of the carbon atoms at the 2-, 3- and/or 6-position of the repeating units have a substituent $Y_2$, $Y_3$ or $Y_6$ different from a hydroxyl group.

The univalent organic group R" can for instance be selected from an alkyl, cycloalkyl, aryl or aralkyl group, which may each be substituted or, preferably, not substituted. If substituted, the alkyl, cycloalkyl, aryl or aralkyl group may contain one or more functional groups each independently selected e.g. from hydroxyl, ether, thiol, thioether, amine, ester, amide, cyano, isocyanate, thioisocyanate, carbamate, epoxy and halogen. Preferably the univalent organic group comprises 1 to 20, more preferably 1 to 12 carbon atoms. Suitable cycloalkyl groups are e.g. a cyclopentyl, cyclohexyl or methylcyclohexyl group. Suitable aryl and aralkyl groups can be exemplified by a phenyl, biphenyl, naphthyl, tolyl, benzyl, xylyl, cumyl, mesityl or ethylphenyl group. Eligible alkyl groups can be linear or branched, preferably comprising 1 to 8 carbon atoms or most preferably 1 to 4 carbon atoms. Examples include methyl, ethyl, propyl, butyl, pentyl, hexyl, heptyl, octyl, hydroxyethyl, hydroxypropyl and the like. Linear acyclic alkyl groups are preferable, in particular linear $C_{1-4}$ alkyl groups such as methyl, ethyl, propyl and butyl.

The group —*OM, which can be introduced by esterification with one or more inorganic oxyacids may e.g. be a nitrate group, a sulfate group or a phosphate group.

The cellulose derivative used in the invention may contain a single type of substituent other than OH at the 2-, 3- or 6-position of the repeating units, or more than one type, i.e. mixed substitution. In a preferred embodiment $Y_2$, $Y_3$ and $Y_6$ of the cellulose derivative of formula (II) are each independently selected from a) a hydroxyl group and b) either —*OR" or —*OC(O)R" or —*OM, and may be the same or different from each other among the repeating units. Accordingly, non-limiting examples of suitable cellulose derivatives include cellulose ester materials such as triacetyl cellulose (TAC), diacetyl cellulose (DAC), cellulose acetate propionate (CAP), cellulose acetate butyrate (CAB) or cellulose nitrate and cellulose ether materials such as methyl cellulose, ethyl cellulose, hydroxy ethyl cellulose, hydroxy propyl cellulose, cyano ethyl cellulose, methyl ethyl cellulose, ethyl propyl cellulose or ethyl hydroxy ethyl cellulose as well as mixed ether-ester cellulose materials such as methyl acetyl cellulose, ethyl acetyl cellulose or ethyl propionyl cellulose.

In a preferred embodiment of the present invention the at least one cellulose derivative is a cellulose ether. The cellulose ether can for instance be a cellulose derivative comprising one or more types of alkoxy groups —*OR" having 1 to 4 carbon atoms, for instance methyl cellulose, ethyl cellulose, propyl cellulose, hydroxyl ethyl cellulose or methyl ethyl cellulose. It is particularly preferred that the at least one cellulose derivative is ethyl cellulose.

The average number of hydroxyl groups per repeating unit which are in total replaced by —*OR", —*OC(O)R" and —*OM groups at the 2-, 3- and 6-position of the glucopyranose units versus the cellulose parent compound is designated as the degree of substitution (DS). In case all hydroxyl groups are replaced, the degree of substitution would for instance be 3.0. The cellulose derivative used according to the present invention can have a degree of substitution in a range from 0.1 to 2.99, preferably from 1.0 to 2.9, more preferably from 2.0 to 2.8, most preferably from 2.2 to 2.6. The degree of substitution may for instance be determined by $^1$H-NMR and $^{13}$C-NMR adapting the methods described in Cellulose Communication, 6 (1999), 73-79 and Chirality, 12 (9), 670-674. In the particular case of ethyl cellulose the degree of substitution may be quantified in accordance with United States Pharmacopeia (USP) XXXII—National Formulary (NF) XXVII monograph "Ethylcellulose", section "Assay" by reaction with an excess of hydroiodic acid, extraction and quantifiable detection of the liberated ethyl iodide by gas chromatography combined with flame ionization.

Cellulose derivatives useful in the present invention can be prepared according to publicly known methods as described e.g. in "Comprehensive Cellulose Chemistry", vol. 2, Wiley-VCH, 2001 or Ullmanns Encyklopadie der technischen Chemie, Verlag Chemie, 4$^{th}$ ed., vol. 9, pp. 192-212 (etherification) and pp. 227-246 (esterification) or vol. 17, pp. 343-354 (nitric acid esterification) from a suitable cellulose raw material such as cotton linter, wood pulp, or a mixture thereof.

$M_w$ of the cellulose derivative used in the invention can e.g. be in a range from 10,000 to 1,000,000 g/mol, preferably from 20,000 to 500,000 g/mol, more preferably from 50,000 to 400,000 g/mol or most preferably from 100,000 to 300,000 g/mol. In a particular embodiment the ratio $M_w/M_n$, is less than 5.0 and more preferably in the range of 1.5 to 3.5. The molecular weight distribution from which $M_n$ and $M_w$ may be determined can be measured experimentally by gel permeation chromatography (GPC) using polystyrene standards as described in the examples.

Numerous commercially available cellulosic materials exist that can readily be used according to the present invention, for instance DAC L50, a diacetyl cellulose material available from Diacel, WALOCEL carboxymethyl cellulose, CELLOSIZE hydroxyethyl cellulose materials and methyl or ethyl cellulose ether materials sold under the tradenames METHOCEL or ETHOCEL, respectively, all available from The Dow Chemical Company, or Walsroder nitro cellulose marketed by Dow Wolff Cellulosics GmbH. Particularly well suited are e.g. ethyl cellulose materials of the grades ETHOCEL STD100 or ETHOCEL MED70.

The composition of the present invention can comprise a mixture of two or more cellulose derivatives as set forth above or, preferably, a single cellulose derivative of such kind. The composition typically comprises the at least one cellulose derivative in an amount in a range from 10 wt. %, preferably from 30 wt. %, to 99.9 wt. %, or preferably to 95 wt. %, or more preferably to 90 wt. %, based on the total weight of solids of the composition. In one embodiment the at least one cellulose derivative is comprised in the composition in an amount ranging from 40 wt. %, preferably from 55 wt. %, or more preferably from 60 wt. %, most preferably from 65 wt. %, to 99 wt. %, preferably to 95 wt. %, or more preferably to 90 wt. %, most preferably to 85 wt. %, based on the total weight of solids of the composition. In another embodiment the at least one cellulose derivative is comprised in the composition in an amount that ranges from 10 wt. %, preferably from 20 wt. %, or more preferably from 25 wt. %, to 70 wt. %, preferably to 50 wt. %, or most preferably to 40 wt. %, based on the total weight of solids of the composition. In a particular embodiment of the present invention the cellulose derivative is comprised in the blend in an amount that corresponds to the balance of the amount of polysiloxane based on the total weight of solids of the blend.

The composition of the present invention can comprise the miscible blend of the at least one cellulose derivative and the at least one polysiloxane as specified above in an amount ranging from 20 to 100 wt. %, preferably from 50 to 100 wt. %, or more preferably from 80 to 100 wt. %, based on the total weight of solids of the composition.

Optionally the composition of the present invention can further comprise one or more additives conventionally used in compounding plastic compositions such as fillers, plasticizers, anti-oxidants, UV absorption agents, anti-static agents, anti-glare agents, lubricants, retardation adjusting agents, thermal stabilizers, radical inhibitors, acid scavengers and polymers other than the cellulose derivative and the polysiloxane described above. Typically the total amount of additives in the inventive composition is in a range from 0 to 20 wt. % based on the total weight of solids of the composition. For detailed information on conventional additives and their typical individual effective amounts it is referred e.g. to paragraphs [0078]-[0098] of US 2008/0107829 A1, H. Zweifel, R. D. Maier, M. Schiller, Plastics Additives Handbook, 6$^{th}$ ed., Carl Hanser Verlag, Munich, 2009, or G. Pritchard, Plastics Additives—An A-Z Reference, Chapman & Hall, London, 1998. Preferentially, additives are selected, which have excellent compatibility with the cellulose derivative and polysiloxane according to the present invention to avoid segregation and leaching. For instance, the composition of the present invention preferably comprises less than 1 wt. %, more preferably less than 0.5 wt. % of plasticizer, based on the total weight of solids of the composition due to the tendency of plasticizers to phase separation and bleed out on the long term and the associated degradation, especially of the optical properties. In a particularly preferred embodiment the composition according to the invention comprises no plasticizer. Herein, "plasticizer" means any additive different from the at least one polysiloxane set forth above that increases the plasticity of the blend composition, in particular low molecular (molecular weight of 1,000 g/mol or less) compounds such as phosphoric acid esters, carboxylic acid esters including phthalic acid esters, alkyl phthalyl alkyl glycolates, citric acid esters or glycerides, esters and amides of fatty acids or glycol esters of coconut oil fatty acids, trimellitic esters, castor oil or derivatives thereof, camphor and polyvalent alcohols and esters conventionally used as plasticizer. Moreover, for the sake of not impairing the low haze and high translucency of the inventive composition or articles prepared thereof, it is particularly preferred that fillers, if used, have an average particle size below the wavelength of visible light, e.g. in a range from 1 to 250 nm, or more preferably 5 to 100 nm, or even more preferably of less than 50 nm. Herein, the average particle size is defined in terms of the diameter of the smallest possible circle that encloses the respective particle completely and touches its outer contours in a two-dimensional electron microscopic image. Determination of the respective average particle size relies on determining the particle size of at least 500 individual particles of the respective type as set forth above and calculating the number averaged particle size.

Suitable fillers include e.g. particles of silica, titania, zinc oxide, tin oxide, magnesium oxide, alumina, zirconia, calcium carbonate, talc, clay, calcined kaolin, calcined calcium silicate, polymer particles e.g. made of acrylic resin or a silicone resin or a mixture of any of the foregoing. If employed, a single or more than one filler can be comprised in the inventive composition in an amount corresponding to 0 to 20 wt. %, e.g. in a range from 0.5 to 15 wt. % or from 1 to 10 wt. % based on the total weight of solids of the composition.

The composition according to the present invention can be prepared by any method for preparing a polymer blend known in the art such as e.g. mixing in solution, melt mixing, melt (co)extrusion or in-situ polymerization. For mixing conventional equipment such as a magnetic stirrer, Brabender mixer, Banbury mixer, a static mixer, rotor-stator mixer, extruder or high shear mixing unit can be employed. The inventive composition can further be processed and formed into articles of various shapes including a film, a sheet, a fiber, an extruded profile, a coated article, an injection molded article, a blow molded article, a rotational molded article or a pultruded article by methods known per se in the art such as solution casting, dipping, spin coating, spraying, roller coating, melt casting or extrusion, blow extrusion, injection molding, pultrusion and the like. Details about the preparation and processing of polymer blends and suitable equipment can e.g. be found in E. Baur, S. Brinkmann, T. A. Osswald, E. Schmachtenberg, Saechtling Kunststoff Taschenbuch, $30^{th}$ ed. Carl Hanser Verlag, Munich, 2007, L. M. Robeson, Polymer Blends—A comprehensive review, Carl Hanser Verlag, Munich, 2007 or L. A. Utraki, Polymer blends handbook, vol. 1, Chapter 9 and 10, Kluwer Academic Publishers, Dordrecht, 2002.

In a particularly preferred embodiment the article comprising a composition according to the invention is an optical film, preferably a protection film for a polarizing plate or a retardation film. The optical film can be a single layer film or a multilayer film.

Such optical film can be prepared preferably by the manufacturing method according to the present invention. Herein, a solution comprising at least one cellulose derivative and at least one polysiloxane as specified above and a solvent is provided.

The solvent can be any solvent or solvent mixture, wherein the at least one cellulose derivative and the at least one polysiloxane set forth above are both soluble, i.e. wherein they exhibit a solubility at 23° C. of at least 10 g/L, preferably at least 25 g/L, or more preferably at least 50 g/L each. Preferentially the solvent is a volatile organic solvent having a boiling point of 150° C. or less such as in a range of 30 to 100° C. at 1 atm in order to provide fast evaporation rates. Suitable solvents comprise hydrocarbons, halogenated hydrocarbons, and hydrocarbons with other functional groups, particularly ethers, ketones, esters and alcohols, and mixtures of any of the foregoing.

Eligible hydrocarbon solvents include e.g. aromatic hydrocarbons with 6 to 18 carbon atoms such as benzene, toluene, xylene or ethylbenzene, acyclic linear or branched, aliphatic hydrocarbons with 5 to 40 carbon atoms, which may be saturated or unsaturated such as naphthas, hexane, heptane, octane, natural or mineral oils, and cycloaliphatic hydrocarbons with 6 to 12 carbon atoms, which can be saturated or unsaturated, exemplified by cyclohexane, cyclohexene and methylcyclohexene.

Suitable halogenated hydrocarbons include halogenated derivatives of the above-mentioned aromatic hydrocarbons as well as aliphatic halogenated hydrocarbons with 1 to 6 carbon atoms, preferably with 1 to 2 carbon atoms. Preferentially the halogen substituent is chlorine. Examples include chlorobenzene, methyl chloride, methylene chloride, chloroform and 1,2-dichloroethane. Among these solvents, methylene chloride is preferred.

Ether solvents can be e.g. cyclic or acyclic ether compounds containing 3 to 12 carbon atoms such as diethylether, diisopropyl ether, dimethoxymethane, 1,4-dioxane, tetrahydrofuran, phenyl ether and benzyl ether as well as ether alcohols comprising one or more condensed alkylene oxide units, preferably ethylene oxide and/or propylene oxide units.

Suitable ketone solvents comprise e.g. acyclic or cyclic ketones with 3 to 12 carbon atoms such as acetone, methyl ethyl ketone, methyl isobutyl ketone, acetophenone, diethyl ketone, diisobutyl ketone, cyclohexanone or cyclopentanone.

Suitable ester solvents include for instance esters with 3 to 12 carbon atoms exemplified by methyl formiate, ethyl formiate, ethyl propionate, methyl acetate, ethyl acetate, isopropyl acetate and cyclohexyl acetate.

Alcoholic solvents that can be used according to the present invention include alcohols with 1 to 12 carbon atoms, preferably 1 to 4 carbon atoms, exemplified by methanol, ethanol, propanol, isopropanol, n-butanol, sec-butanol, isobutanol, cyclohexanol, furfuryl alcohol, benzylalcohol, wherein ethanol is preferable.

Any of the foregoing solvents may be utilized singly or, preferably, a mixture of two or more of the foregoing solvents may be employed. Such mixtures could for instance comprise a combination of an aromatic hydrocarbon and an alcohol, of an aromatic hydrocarbon and an ester and/or a ketone, of an ester and an alcohol, of a ketone and an alcohol or of a halogenated hydrocarbon and an alcohol. Specific non-limiting examples include a toluene-ethanol mixture, a toluene-acetone-ethyl acetate mixture, a chloroform-ethanol mixture, a methylene chloride-methanol mixture, an ethyl acetate-ethanol mixture and a methylene chloride-ethanol mixture. In a preferred embodiment a halogenated hydrocarbon such as methylene chloride or an aromatic hydrocarbon such as toluene is the main component of the solvent mixture, wherein it may be comprised in an amount of 60 wt. % or more, preferably 70 wt. % to 95 wt. %, based on the total weight of the solvent mixture.

Dissolving the at least one cellulose derivative and the at least one polysiloxane is typically achieved by charging these components, which may be roughly pre-mixed, and the solvent to a vessel equipped with means for stirring. The charge of the vessel is then stirred optionally under heating or cooling until a homogeneous solution has been formed. Additives, if used, may be added prior to the film production process upon preparation of the cellulose derivate and/or polysiloxane or at different stages of the film production process, e.g. upon preparation of the solution or by subsequent admixing prior to or during casting.

The total solids content of the solution at the time of casting can be in a range from 1 to 50 wt %, more preferably from 5 to 40 wt %, even more preferably from 10 to 35%, or particularly preferable from 25 to 35 wt. %, based on the total weight of the solution. It is a particular advantage of the method of the present invention that contrary to conventional solution casting processes using dope solutions of a pure cellulose derivative the solids content can be significantly increased by addition of the polysiloxane specified above without an excessive increase of the viscosity.

The provided solution is cast onto a support using conventional solution casting equipment. The support is typically a flat solid body preferably with a mirror-finished surface and may for instance be a band, drum, plate, sheet, foil or film made of a polymeric material, a glass or a metal. Commonly the solution is cast at a temperature in the range of 15 to 35° C., but casting at a higher or lower temperature provided by heating or cooling of the support and/or the solution is also possible. The thickness of the cast film may be controlled by adjustment of the amount of solution applied per area and/or the solids content of the solution.

After casting, at least a part of the solvent is evaporated from the cast film by drying while the film is still on the support or after stripping off for instance by means of heating the support from the back, heating both surfaces of the support e.g. by radiant heat, exposing the film to a stream of air or another gas, which may optionally be heated, by microwave heating, by applying a vacuum or any combination thereof. The residual solvent content in the optical film after completion of the film preparation process according to the invention is preferably below 5 wt. %, more preferably below 2 wt. %, even more preferably below 1 wt. % based on the total weight of the film. By two or more simultaneous or sequential castings, a multilayer film comprising at least one layer comprising a miscible blend of at least one cellulose derivative and at least one polysiloxane as specified above can be obtained.

The single layer or multi layer optical film obtained according to the foregoing procedure may optionally be subjected to an additional orientation treatment by mechanical stretching in at least one direction. Stretching causes an orientation of the polymer molecules constituting the film generating anisotropic optical film properties. By controlling the stretching conditions the out of plane retardation ($R_{th}$) and in particular the in plane retardation ($R_0$) can be adjusted within the ranges specified below for the inventive optical film. The optional stretching of the film is typically performed either uniaxially or biaxially, at a temperature at or above the glass transition temperature ($T_g$) of the film material, e.g. in the range of $T_g$ to $T_g+50°$ C., more preferably in the range of $T_g+5°$ C. to $T_g+30°$ C. The stretching can be carried out using a conventional tenter, e.g. a pin tenter, a clip tenter or a biaxial stretching tenter. Detailed information on suitable conditions for film stretching can be found e.g. in "Plastic Films" by John H. Briston, Chapter 8, pp. 87-89, Longman Scientific & Technical (1988).

The optical films of this invention may optionally moreover be subjected to a surface treatment, preferably to a physical and/or chemical treatment that reduces the water contact angle, i.e. renders the surface more hydrophilic to enhance the optical film's adhesion and compatibility to hydrophilic materials. Possible physical treatments include subjecting the film to a plasma, irradiation with energetic radiation such as UV light or energetic particles such as electrons. A chemical treatment commonly involves contacting the film with a reactive medium for instance by dipping, spraying or coating a reactive solution, for instance saponification in acid or alkaline medium according to methods well known in the art. In a particularly preferred embodiment of the present invention the optical film is subjected to a plasma treatment such as a glow discharge or a corona discharge plasma. The plasma treatment can e.g. be conducted in an atmosphere of air, $O_2$, Ar, He, Ne, Kr, Xe, $N_2$, $CO_2$ or chlorofluorocarbons and mixtures thereof as excitation gas under a pressure in the range from 1 mbar to 5 bar. It is a particular advantage of the present invention that a short plasma treatment, e.g. for a duration of 5 min or less, preferably 2 min or less, can convert the considerably hydrophobic surface of an untreated cellulosic film according to the invention having a water contact angle of typically 50 to 70° to a hydrophilic surface having a water contact angle of 20° or less.

The optical film according to the present invention typically has a thickness in the range of 5 µm to 200 µm, preferably in the range of 15 µm to 150 µm, more preferably in the range of 25 µm to 120 µm and even more preferably in the range of 60 µm to 100 µm for a protection film or 40 to 80 µm for a retardation film. The film thickness can be measured by common techniques, e.g. by a micrometer screw.

Such an optical film according to the invention can typically have one or more or preferably all of the following properties, which makes it highly attractive e.g. for LCD applications.

For instance, the optical film according to the invention can have a haze as measured in accordance with ASTM D-1003 of no more than 1%, preferably of no more than 0.5% and/or a light transmittance in the visible spectral range of at least 85%, preferably of at least 90%, or more preferably of at least 92% as measured in accordance with ASTM D-1003. The haze and light transmittance can be measured by a transmittance and haze meter (BYK-Gardner AT 4727 haze guard dual).

Further, the optical film according to the invention can have an out of plane retardation defined by equation (1)

$$R_{th} = \left(\frac{n_x + n_y}{2} - n_z\right) \times d, \quad (1)$$

at a wavelength of 588 nm in the range of 0 to 1000 nm, preferably in a range of 0 to 275 nm. The in plane retardation defined by equation (2)

$$R_0 = (n_x - n_y) \times d \quad (2)$$

can be in a range of 0 to 500 nm, preferably 0 to 200 nm, or more preferably 0 to 100 nm. In equations (1) and (2) d denotes the film thickness, $n_x$ is the refractive index for the direction having the highest refractive index in the film plane (x-direction), $n_y$ is the refractive index in the direction perpendicular to the x-direction in the film plane (y-direction) and $n_z$ is the refractive index along the film thickness direction (z-direction). As is obvious to the skilled artisan, depending on the mode of liquid crystal switching, optical retardation films with different birefringence characteristics are required in LCD application to achieve the optimum optical compensation. LCDs operated under in-plane switching (IPS) mode require e.g. optical retardation films with retardation values as small as possible. It is a particular benefit of the present invention that the out of plane retardation can be adjusted in a wide range by controlling the amount of the polysiloxane additive as $R_{th}$ is steadily reduced with increasing weight percentage of the polysiloxane specified above in the composition. Thus it is e.g. possible to reduce $R_{th}$ from a value of above 300 nm of a pure ethyl cellulose film with a thickness of 40 µm, which is too high for most LCD applications, down to <300 nm, e.g. <150 nm. In a particular embodiment, the optical film according to the invention can have an $R_{th}$ of 10 nm or less. In another embodiment, the inventive optical film has an out of plane retardation in the range of 40 to 200 nm, preferably of 80 to 160 nm. The in plane retardation may particularly be controlled by mechanical stretching of the film as set forth above. For an unstretched optical film according to the invention $R_0$ is typically <5 nm such as <2 nm. The optical retardation characteristics can be measured by an elliptically polarized light measuring system such as an Automatic Birefringence Analyzer Kobra-WR from Oji Trading Co., Ltd. Herein, the calculation of $R_0$ and $R_{th}$ requires inputting the film thickness and a value for the average refractive index $n_0$, which is defined by equation (3)

$$n_x + n_y + n_z = 3n_0 \quad (3).$$

The average refractive index of the material, which the film consists of, may be determined experimentally e.g. using an Abbe refractometer according to ASTM D542-00 (2006).

Moreover, the optical film according to the present invention can exhibit a water vapor permeation rate (WVPR) of 900 g/(m²·day) or less, preferably of 700 g/(m²·day) or less, such as in a range of 400 to 700 g/(m²·day), as measured in accordance with ASTM F-1249 at 40° C. and 90% relative humidity (RH) and normalized to a film thickness of 80 µm. It is a surprising finding of the present invention that blending a polysiloxane additive as specified above significantly reduces the WVPR of cellulosic films.

The optical film according to the invention may further have a single glass transition temperature, as measured by differential scanning calorimetry (DSC) in accordance with ISO 11357-2, which indicates the excellent miscibility of the at least one cellulose derivative and the at least one polysiloxane specified above. Typically the single glass transition temperature is between the $T_g$ of the pure cellulose derivative and the $T_g$ of the pure polysiloxane, which form the blend.

Furthermore the optical film can exhibit a water contact angle of 20° or less, preferably in a range of 5 to 15°, measurable with a contact angle test system as described in the examples. Such hydrophobic surface properties can be imparted to the film in particular by surface treatment e.g. plasma treatment as explained above.

The foregoing properties can preferentially be achieved without a considerable change of the mechanical properties compared to a film of the respective pure cellulose derivative. In a particular embodiment, the tensile break elongation and/or the tensile modulus of the inventive optical film differ by not more than 30%, preferably by not more than 20% from the tensile break elongation or the tensile modulus of a film of the respective pure cellulose derivative and the same thickness, respectively. The tensile break strength of an optical film according to the invention is preferably at least 60%, more preferably at least 70%, even more preferably at least 80% of the tensile break strength of a film of the respective pure cellulose derivative and the same thickness. Said mechanical properties can be measured according to ASTM D-1708 using a tensile testing machine.

The optical films of this invention can be laminated with other films to form a composite structure. The optical film of the present invention may in particular be utilized to produce a polarizing plate comprising a polarizer and two optical films, one disposed on each face of the polarizer, wherein at least one of the optical films is a protection or retardation film according to the present invention. Besides the at least one optical film according to the invention the polarizing plate may comprise one or more conventional protection and/or retardation films e.g. commercially available cellulose acylate films such as TAC films. The polarizer can e.g. be an iodine-based polarizer, a dye-based polarizer or a polyene-based polarizer. Iodine- and dye-based polarizers are typically made by absorption of iodine-potassium iodide or dichroic dyes to a PVA-based film by immersion in a solution of said dopant and uniaxial stretching of the film, which orients the absorbed molecules being responsible for the film's polarizing properties. Typically the polarizer has a thickness in the range from 10 to 40 µm, preferably from 15 to 30 µm, after stretching.

Optionally, one or more additional functional films may be applied between the polarizer and one or both of said optical films or on top of one or both of said optical films. Such functional films may for instance be selected from an anti-reflection film, a light scattering film, a transparent hard coat, an antistatic film, an adhesive film, a UV absorption film, a polarizing film or a combination thereof. Alike films are described e.g. in paragraph [0150] to [0220] of US 2008/0227881 A1.

The method by which the at least one optical film according to the present invention, optional conventional protection and/or retardation films and/or other functional films, can be applied to the polarizer to form the polarizing plate is not particularly limited. They may for instance be directly laminated or stuck onto the polarizer. If required, a pressure-sensitive adhesive e.g. on the basis of acrylate, silicone, urethane, polyvinyl alcohol or polyvinyl butyral could be employed to facilitate bonding between any two of the previously mentioned films. As known to the skilled artisan, the optical films and the polarizer may in particular be applied to each other in preferred orientations with respect to their optical axes.

A polarizing plate comprising at least one optical film according to the invention may be used in a liquid crystal display device such as a flat panel television screen, computer screen, mobile phone, digital camera or touch screen device. Such liquid crystal display device typically comprises a liquid crystal cell and two polarizing plates, one disposed on each of the two major sides of the liquid crystal cell, wherein at least one of the polarizing plates comprises at least one optical film according to the invention. Preferably a retardation film according to the invention is used on the side of the polarizing plate facing the liquid crystal cell. The liquid crystal cell typically comprises a conventional liquid crystal material between two sheets of conventional electrode substrates. The cell may be designed for operation in various modes known in the art including e.g. IPS (in-plane switching) mode, TN (twisted nematic) mode, FLC (ferroelectric liquid crystal) mode, OCB (optically compensatory bend) mode, STN (super twisted nematic) mode, VA (vertically aligned) mode or HAN (hybrid aligned nematic) mode. For details concerning LCD engineering and optics it is referred to P. Yeh, C. Gu, Optics of liquid crystal displays, $2^{nd}$ ed., John Wiley & Sons Inc., Hoboken, N.J., 2010.

The present invention will be illustrated in more detail by the following examples, but the invention is not meant to be limited by these. References to standards such as ISO or ASTM standards within this invention relate to the latest version of the corresponding standard publicly available at the effective date of filing, if not specified else.

EXAMPLES

Materials
ETHOCEL STD 100 (EC STD 100): Ethyl cellulose available from The Dow Chemical Company, DS: 2.5, $M_w$: ~228,000 g/mol
DC Z6018: Solid hydroxyl-functional silicone resin having Si-bound propyl and phenyl groups available from Dow Corning Corp., content of Si-bound OH groups: 6 wt. %, molar ratio Ph/propyl: 2.7/1, $M_w$: 1,657 g/mol, structural parameters as determined by $^{29}$Si-NMR: a: 0, b: 0.72, c: 0.28, d: 0
DC 249: Solid flake hydroxyl-functional silicone resin having Si-bound methyl and phenyl groups available from Dow Corning Corp., content of Si-bound OH groups: 5 wt. %, molar ratio Ph/Me: 1.3/1, $M_w$: 2,763 g/mol, structural parameters as determined by $^{29}$Si-NMR: a: 0, b: 0.67, c: 0.33, d: 0
DC 233: Solid flake hydroxyl-functional silicone resin having Si-bound methyl and phenyl groups available from Dow Corning Corp., content of Si-bound OH groups: 5 wt. %, molar ratio Ph/Me: 2.7/1, $M_w$: 4,220 g/mol, structural parameters as determined by $^{29}$Si-NMR: a: 0.02, b: 0.54, c: 0.44, d: 0

Silwet L-7002: Silicone with pendant polyether groups available from Momentive Performance Materials Holdings Inc. having a molar ratio of EO:PO:methyl-substituents of 5.6:3.9:1 as determined by $^{13}$C-NMR analysis, $M_w$: 16,940 g/mol.

MQ SR545: Solid flake silicone resin having Si-bound methyl and phenyl groups available from Momentive Performance Materials Holdings Inc., content of Si-bound OH groups: 2 wt. %, $M_w$: 8,629 g/mol, structural parameters as determined by $^{29}$Si-NMR: a: 0.54, b: 0, c: 0.07, d: 0.39.

Ethyl phthalyl ethyl glycolate (EPEG): plasticizer, purity: 96.4%, supplied by Westingarea Corp.

Triacetyl cellulose (TAC): acetyl content: 43-44 wt. %, supplied by Acros Organics Molecular Weight Determination The above-mentioned weight average molecular weights of ETHOCEL STD 100 and the employed polysiloxanes were measured by gel permeation chromatography (GPC) using an Agilent 1200 instrument equipped with an Agilent refractive index detector held at a temperature of 40° C. For each measurement 20 mg of the cellulose derivative or the polysiloxane, respectively, was dissolved in 10 mL of tetrahydrofuran (THF). A 20 µL aliquot of this solution was then injected into the inlet port of the GPC instrument operated with a constant elution rate of 0.3 mL THF per minute utilizing two mini mixed D columns (4.6×250 mm) in tandem mode held at 40° C. for separation according to molecular weight. The absolute weight average molecular weight ($M_w$) data thus obtained with the system was calibrated using PL polystyrene narrow standards (part no. 2010-0101) with molecular weights ranging from 580 to 316,500 g/mol.

Determination of Structural Parameters a, b, c and d of the Polysiloxane

The molar fractions of the unsubstituted, mono-, di- and trifold substituted structural monomer units constituting the polysiloxane have been determined quantitatively by $^{29}$Si-NMR spectroscopy for the employed polysiloxanes and are reported above. Solid-state NMR experiments were conducted on a Bruker AVANCE 400 wide bore spectrometer. The NMR data were acquired at room temperature (22° C.) at a $^{29}$Si resonance frequency of 79.4 MHz. Magic-angle spinning (MAS) was employed at a spinning frequency of 4 kHz using a 7-mm MAS probe and zirconia sample rotors. The polysiloxane powders were each finely ground using a mortar and pestle and then loaded into the MAS rotors. $^{29}$Si DP/MAS (direct polarization/MAS) experiments were performed with a 5-µs 90° excitation pulse, a 500 second recycle delay (time between scans), and 50-kHz TPPM decoupling during acquisition. Each spectrum was acquired with 192 scans. Chemical shifts (δ) were calibrated with an external standard of tris (trimethylsilyl)silane (TTMSS, δ=−9.83, −138.36 ppm). Peak assignments to mono-, di-, or trifold substituted or unsubstituted structural monomer units of the polysiloxanes were made according to chemical shifts characteristic to each respective structure known to the skilled artisan, e.g. from G. Engelhardt et al., Journal of Organometallic Chemistry, vol. 54 (1974), 115-122, C.-B. Wu et al., High Performance Polymers, vol. 22 (2010), 959-973, Huang, et al., Journal of Applied Polymer Science, vol. 70 (1998), 1753-1757. For the employed polysiloxanes peaks as indicated below were observed and assigned accordingly as follows: δ=11.6 ppm $(Me)_3Si(O_{1/2})$, δ=−17.5 ppm $(Me)_2Si(O_{1/2})_2$, δ=−32.6 ppm $(Me)(Ph)Si(O_{1/2})_2$, δ=−38.5 ppm $(HO)(Ph)_2Si(O_{1/2})$, δ=−45.5 ppm $(Ph)_2Si(O_{1/2})_2$, δ=−56.2 ppm $(HO)(Alk)Si(O_{1/2})_2$, δ=−63.6 ppm $(Alk)Si(O_{1/2})_3$, δ=−68.7 ppm $(HO)(Ph)Si(O_{1/2})_2$, δ=−78.8 ppm $(Ph)Si(O_{1/2})_3$, δ=−100.3 ppm $R'''OSi(O_{1/2})_3$, δ=−109.4 ppm $Si(O_{1/2})_4$ with Alk being methyl or propyl, respectively, Me being methyl, Ph being phenyl and R''' being H or an organic moiety. The molar fractions were calculated as the ratio of the cumulated integrated area of all peaks related to the respective type of structural monomer unit (a: $[R^1R^2R^3SiO_{0.5}]$, b: $[R^4R^5SiO]$, c: $[R^6SiO_{1.5}]$, d: $[SiO_2]$) to the cumulated total integrated area of all peaks. Peak deconvolution of each $^{29}$Si DP/MAS NMR spectrum was performed using the DMFit curve-fitting program (D. Massiot et al., Magn. Reson. Chem., vol. 40 (2002), 70-76). The peaks were freely fit with mixed Gaussian/Lorentzian character, linewidth and intensity as deconvolution parameters. Major spinning sidebands resulting from magic-angle spinning at 4 kHz were accounted for in the fitting. If the parameter value a, b, c or d associated with a specific structural monomer unit is reported to be zero, it means that no signal corresponding to the respective structural units could be detected within the $^{29}$Si-NMR analysis, but does not preclude the actual presence of such structural units in an amount below the detection limit.

Dope Preparation

Table 1 summarizes the formulation of the prepared dope solutions. The quoted amount of the respective solvents mixture was each poured in a mixing bottle and stirred. Subsequently, the additive, if any, was added to the solvents mixture in the quantity stated in Table 1 and stirred until it was completely dissolved. Finally, the quoted amount of the cellulose derivative listed in Table 1, if any, was added to the solution and mixed using a Rolaauv1S low profile roller mixer from Stovall Life Science Inc. at 10 rpm and 23° C. for 15 hours to dissolve the ingredients completely.

TABLE 1

Dope formulations

| Dope | Cellulose derivative | | Additive | | Solvent | | Weight ratio Additive/Cellulose derivative | Wt. % |
|---|---|---|---|---|---|---|---|---|
| | Material | Mass [g] | Material | Mass [g] | Mixture | Mass [g] | | |
| A (Inventive example) | EC STD 100 | 10.0 | DC 249 | 1.1 | A | 90 | 10/90 | 11.0 |
| B (Inventive example) | EC STD 100 | 10.0 | DC 249 | 4.3 | A | 90 | 30/70 | 13.7 |
| C (Inventive example) | EC STD 100 | 10.0 | DC 249 | 10.0 | A | 90 | 50/50 | 18.2 |
| D (Inventive example) | EC STD 100 | 10.0 | DC 249 | 23.3 | A | 90 | 70/30 | 27.0 |
| E (Inventive example) | EC STD 100 | 15.0 | DC 249 | 15.0 | B | 85 | 50/50 | 26.1 |
| F (Inventive example) | EC STD 100 | 10.0 | DC Z6018 | 2.5 | A | 90 | 20/80 | 12.2 |
| G (Inventive example) | EC STD 100 | 10.0 | DC Z6018 | 6.7 | A | 90 | 40/60 | 15.6 |
| H (Inventive example) | EC STD 100 | 10.0 | DC Z6018 | 10.0 | A | 90 | 50/50 | 18.2 |
| I (Inventive example) | EC STD 100 | 10.0 | DC 233 | 10.0 | A | 90 | 50/50 | 18.2 |

TABLE 1-continued

Dope formulations

| Dope | Cellulose derivative | | Additive | | Solvent | | Weight ratio Additive/Cellulose derivative | Wt. % |
|---|---|---|---|---|---|---|---|---|
| | Material | Mass [g] | Material | Mass [g] | Mixture | Mass [g] | | |
| J (Comparative example) | EC STD 100 | 10.0 | — | — | A | 90 | 0/100 | 10.0 |
| K (Comparative example) | TAC | 15.0 | — | — | B | 85 | 100/0 | 15.0 |
| L (Comparative example) | EC STD 100 | 10.0 | EPEG | 1.1 | A | 90 | 10/90 | 11.0 |
| M (Comparative example) | EC STD 100 | 10.0 | MQ SR545 | 4.3 | A | 90 | 30/70 | 13.7 |
| N (Comparative example) | EC STD 100 | 10.0 | Silwet L-7002 | 1.1 | A | 90 | 10/90 | 11.0 |

Solvent A [parts by weight]: Toluene/Acetone/Ethyl acetate 84/5.3/10.7
Solvent B [parts by weight]: MeCl$_2$/Methanol 87/13

Dope Viscosity

The viscosity of the dope solutions was measured at a temperature of 25° C. set by means of a water bath with a Brookfield viscometer DV III ultra (Brookfield Engineering Laboratories Inc.) employing a no. 4 spindle at 10 rpm and a reading time of 1 min. The results are presented in Table 2.

TABLE 2

Dope viscosities

| Dope | Viscosity [mPa · s] |
|---|---|
| A (Inventive example) | 2,240 |
| B (Inventive example) | 2,247 |
| C (Inventive example) | 2,293 |
| D (Inventive example) | 2,593 |
| F (Inventive example) | 2,160 |
| G (Inventive example) | 2,120 |
| H (Inventive example) | 2,120 |
| I (Inventive example) | 2,327 |
| J (Comparative example) | 2,327 |
| E (Inventive example) | 8,347 |
| K (Comparative example) | 17,727 |

The comparison of dope samples A-D, F-I versus J shows that the addition of different polysiloxanes as specified above each allows to increase the solid content of the dope solution by 10% up to 82% without increasing the dope viscosity, or to increase the solid content by a factor of 2.7 at a moderate viscosity increase of less than 12% versus pure ethyl cellulose. This facilitates a more economic further processing of the dope solutions e.g. in solution-based production processes reducing the consumption of organic solvents, which are not only a cost factor, but also an environmental burden. The comparison of dope E versus dope K illustrates further that dope solutions comprising ethyl cellulose and a polysiloxane as set forth above can have almost double the solid content of a conventional TAC dope at a viscosity, which is less than half the value of the TAC dope. This indicates better processing characteristics of the inventive dope and a higher productivity upon its use e.g. in solution casting of optical films compared to state of the art TAC dopes.

Film Preparation

Films were prepared by casting the above-mentioned dope solutions each on a glass substrate having dimensions of 150 mm×150 mm by using an Elcometer 4340 Automatic Film Applicator, which was located in a ventilated enclosure. The gap between the casting knife and the substrate was set to achieve films with a thickness of 90±5 µm in the dry state. The glass was cleaned with a small amount of methanol on a lint-free wipe to remove any airborne debris from the surface prior to casting. A strip of dope solution was poured quickly, taking care not to introduce bubbles along the casting knife and subsequently the film was cast by movement of the casting knife at a rate of 2 cm/sec. The cast film was covered with an inverted metal tray to create a vapor-rich environment over the film and dried at 23° C. for 15 h. Subsequently the cover was removed and the films dried further in an oven at 60° C. for 2 h and then at 120° C. for 2 h. The dried film was peeled off the glass substrate for further processing and/or characterization. The thickness of the dried films was measured with a micrometer. For reference purposes a commercial TAC protection film for LCD polarizers (Ref-A, thickness: 81 µm) and a commercial VA-TAC retardation film (Ref-B, thickness: 41 µm), both manufactured by Konica Minolta Optics Inc. were investigated. For the prepared films a fixed thickness of 90±5 µm was selected for the sake of consistency, although it is recognized that films with different optimum thickness might be required for specific applications, e.g. 20 to 60 µm for conventional retardation films or 60-100 µm typically for protection films. The film thickness can easily be adjusted to such different requirements without deviating from the invention.

Film Characteristics

Nanostructure

The nanostructure of the films was investigated by transmission electron microscopy. To this end, sections of approximately 60 nm thickness were obtained from the central region of the cast films by using a diamond knife on a Leica EM UC6 microtome and collected on a 1000 mesh TEM grid each. At least one grid affixed section of each film was further stained by exposure to the vapor phase of a 0.5 wt. % aqueous ruthenium tetraoxide solution for 10 minutes. TEM images were collected for stained and unstained samples on a JEOL JEM-1230 operated at 100 kV accelerating voltage with Gatan-791 and 794 digital cameras. The TEM images of films according to the invention exhibited a very homogeneous nanostructure. If exhibiting distinct features at all, they showed features with a length in the longest dimension of less than 200 nm dispersed in a uniform matrix. This indicates excellent miscibility of the cellulose derivative with a polysiloxane as set forth as component of the composition of the present invention.

Water Vapor Permeation Rate

The moisture permeability of the films was determined in accordance with international standard ASTM F-1249-06 using a MOCON PERMATRAN-W® Model 3/33 MG device. For each measurement a film sample with a diameter of 50 mm was tested at 40° C. and 90% RH until steady state conditions were reached, which was considered to be reached when the change of the amount of water transmitted per time unit was below 5% over one hour. From the amount of water transmitted per time unit under steady state conditions and the area, the water vapor permeation rate (WVPR) in g/(m$^2$·day) was calculated and normalized to a film thickness of 80 µm.

Transparency and Haze

The film haze and transparency were measured on a sample of 50 mm×50 mm in accordance with international standard ASTM D-1003 using a transmittance and haze meter (BYK-Gardner AT 4727 haze guard dual) in a wavelength range of 380 to 700 nm averaging over five individual measurements.

Refraction Index

The average refractive index of the films ($n_0$) was each measured for a specimen of approximately 20 mm×8 mm using a multi-wavelength Abbe refractometer (Atago DR-M2). All measurements were conducted at 589 nm wavelength and 25° C. A small drop of contact liquid with high refractive index (Gem Clearing Liquid manufactured by Cargille Laboratories, Cedar Grove, N.J., USA) was used during the measurement. The contact liquid was placed between the film specimen and the main prism so that the light could be coupled from the edge of film specimen into the prism. Care was taken to ensure the thin contact liquid was evenly spread between the sample and the main prism without any bubble.

Retardation

The optical retardation characteristics were measured on 20 mm×20 mm cut samples of the films using an elliptically polarized light measuring system (Automatic Birefringence Analyzer Kobra-WR from Oji Trading Co., Ltd.) at a wavelength of 588 nm and a temperature of 23° C. The in-plane retardation $R_0$ and the out-of-plane retardation $R_{th}$ were calculated automatically by the system software taking into account the film thickness d and the average refractive index $n_0$ entered as input parameters.

Tensile Test

The tensile properties of the films were analyzed according to international standard ASTM D-1708 using an INSTRON 5566 universal testing machine at a speed of 5 mm/min at a temperature of 23° C.

Thermal Properties

The glass transition temperature and the melting enthalpy of the films were each determined by differential scanning calorimetry (DSC) analysis using a TA-Q2000 instrument in a nitrogen atmosphere with a $N_2$ flow rate of 50 mL/min. About 10 mg of the respective film sample were accurately weighed into the sample holder and equilibrated in the instrument at a temperature of −85° C. The test procedure comprised subsequently heating the sample to a temperature of 180° C. with a rate of 10 K/min, an isothermal dwell at 180° C. for 3 min, cooling to −85° C. with a rate of 10 K/min, holding that temperature for 3 min, heating to 200° C. with a rate of 10 K/min and finally cooling naturally to ambient temperature. The automatic analysis tool in the universal analysis 2000 software was used to determine the glass transition temperature in accordance with ISO 11357-2 and the melting enthalpy in accordance with ISO 11357-3.

The measured optical film properties are summarized in Table 3, the moisture barrier, mechanical and thermal properties in Table 4.

TABLE 3

Optical film properties

| Film | Dope | Cellulose derivative | Additive | Wt. % additive | Thickness [μm] | Transparency [%] | Haze [%] | $n_0$ | $R_0$ [nm] | $R_{th}$ [nm] |
|---|---|---|---|---|---|---|---|---|---|---|
| 1 (Inv. Ex.) | A | EC STD | DC 249 | 10 | 91 | 93.3 | 0.2 | 1.4769 | 0.8 | 595 |
| 2 (Inv. Ex.) | B | EC STD | DC 249 | 30 | 92 | 93.3 | 0.2 | 1.4850 | 0.9 | 262 |
| 3 (Inv. Ex.) | C | EC STD | DC 249 | 50 | 91 | 93.3 | 0.2 | 1.4919 | 0.9 | 28 |
| 4 (Inv. Ex.) | D | EC STD | DC 249 | 70 | 90 | 93.1 | 0.4 | 1.4984 | 0.7 | 2 |
| 5 (Inv. Ex.) | F | EC STD | DC Z6018 | 20 | 90 | 93.3 | 0.2 | 1.4818 | 0.9 | 451 |
| 6 (Inv. Ex.) | G | EC STD | DC Z6018 | 40 | 89 | 93.0 | 0.2 | 1.5003 | 0.9 | 182 |
| 7 (Inv. Ex.) | H | EC STD | DC Z6018 | 50 | 87 | 92.8 | 0.2 | 1.5042 | 0.9 | 88 |
| 8 (Inv. Ex.) | I | EC STD | DC 233 | 50 | 88 | 92.7 | 0.1 | 1.5028 | 1.1 | 54 |
| 9 (Comp. Ex.) | J | EC STD | — | 0 | 92 | 93.9 | 0.3 | 1.4678 | 0.8 | 717 |
| 10 (Comp. Ex.) | L | EC STD | EPEG | 10 | 89 | 93.2 | 0.4 | 1.4753 | 0.7 | 137 |
| 11 (Comp. Ex.) | M | EC STD | MQ SR545 | 30 | 90 | 91.5 | 16.5 | N/m | 0.7 | 397 |
| 12 (Comp. Ex.) | N | EC STD | Silwet L-7002 | 10 | 89 | 93.1 | 5.4 | 1.4761 | 0.6 | 581 |
| Ref-A (Comp.) | — | TAC | N/a | N/a | 81 | 93.4 | 0.5 | 1.4838 | 1.4 | 56 |
| Ref-B (Comp.) | — | TAC | N/a | N/a | 41 | 93.3 | 0.3 | 1.5009 | 49.5 | 123 |

N/a: not available
N/m: not measurable due to high haze ($n_0$ of pure EC STD 100 (Film 9) assumed for calculation of $R_0$ and $R_{th}$)

Films of inventive compositions comprising a miscible ethyl cellulose-polysiloxane blend (Examples 1-8) exhibit a transparency of more than 92.5% and a haze below 0.5% similar to a pure ethyl cellulose film (Comparative Example 9) even for a high additive content such as up to 50 to 70 wt. % indicating the excellent compatibility of ethyl cellulose and the hydroxyl-functional alkyl-, phenyl-substituted polysiloxanes DC-249, DC Z6018 and DC233. Films comprising a blend with a polyether-modified silicone (Comparative Example 12) or with a silicone additive based on structural units [$R^1R^2R^3SiO_{0.5}$] and [$SiO_2$] (Comparative Example 11) are on the contrary very hazy, even at a comparatively low additive content of 10 or 30 wt. %, respectively, illustrating the lack of compatibility with respect to cellulose derivatives for types of polysiloxane additives not according to the structure set forth above for the polysiloxane component of the inventive composition. The transparency and haze of the inventive films is comparable to commercial TAC protection and retardation films (Ref-A and Ref-B) illustrating the potential of the inventive ethyl cellulose films for optical applications. Moreover, $R_{th}$ of the ethyl cellulose-polysiloxane films according to the invention decreases continuously with increasing amount of added polysiloxane (Examples 1-4 and 5-7) and can be adjusted easily in a wide range from e.g. 717 nm (pure ethyl cellulose film, Comparative Example 9) to 2 nm (70 wt. % polysiloxane additive, Example 4). Thus $R_{th}$ values can be readily accommodated to the targeted application and the problem of a too high $R_{th}$ of pure ethyl cellulose films of conventional thickness for most LCD applications can thus be overcome without having to add expensive retardation adjustment agents. For instance ethyl cellulose-polysiloxane retardation films with a $R_{th}$ of 120-140 nm or <10 nm as required for VA-mode or IPS-mode LCDs, respectively, are feasible. $R_0$ could be adjusted to the requirements of the respective targeted application conveniently by conventional film stretching. $R_{th}$ of pure ethyl cellulose may also be reduced significantly by the addition of a plasticizer such as EPEG as shown by Comparative Example 10, however, at the expense of a degraded mechanical strength (see below) and a lack of long term stability due to the tendency of conventional plasticizers to segregate and bleed out as evidenced e.g. by US 2009/0280271 A1. These drawbacks can be avoided by the use of a polysiloxane additive set forth as component of the composition according to the present invention.

exhibit a comparable tensile modulus and—at least up to 50 wt. % polysiloxane additive based on the total weight of solids—a comparable tensile break elongation. At a polysiloxane content of at least up to 20 wt. % based on the total weight of solids also the tensile break strength is comparable (Examples 1 and 5 versus Comparative Example 9), whereas at polysiloxane levels of 30 wt. % or more the tensile break strength decreases with increasing polysiloxane content (Examples 2-4, 6-7, 8). Conventional additives such as EPEG plasticizer (Comparative Example 10) or polyether-modified

TABLE 4

Water vapor permeation, mechanical and thermal film properties

| Film | Cellulose Dope derivative | Additive | Wt. % additive (based on solids) | Thickness [μm] | WVPR [g/(m³·day)]* | Tensile break strength [MPa] | Tensile break elongation [%] | Tensile modulus [GPa] | $T_g$ [° C.] | Melting enthalpy, KJ/Kg |
|---|---|---|---|---|---|---|---|---|---|---|
| 1 (Inv. Ex.) | A  EC STD | DC 249 | 10 | 91 | 996 | 61 | 16 | 1.9 | 134 | 3.7 |
| 2 (Inv. Ex.) | B  EC STD | DC 249 | 30 | 92 | 756 | 49 | 17 | 1.9 | 122 | 0 |
| 3 (Inv. Ex.) | C  EC STD | DC 249 | 50 | 91 | 636 | 35 | 15 | 1.9 | 119 | 0 |
| 4 (Inv. Ex.) | D  EC STD | DC 249 | 70 | 90 | 443 | 37 | 5 | 1.9 | 111 | 0 |
| 5 (Inv. Ex.) | F  EC STD | DC Z6018 | 20 | 90 | 866 | 58 | 15 | 2.0 | 125 | 1.8 |
| 6 (Inv. Ex.) | G  EC STD | DC Z6018 | 40 | 89 | 634 | 45 | 14 | 1.9 | 124 | 0 |
| 7 (Inv. Ex.) | H  EC STD | DC Z6018 | 50 | 87 | 559 | 39 | 15 | 1.8 | 119 | 0 |
| 8 (Inv. Ex.) | I  EC STD | DC 233 | 50 | 88 | 548 | 40 | 14 | 2.0 | 118 | 0 |
| 9 (Comp. Ex.) | J  EC STD | — | 0 | 92 | 1049 | 59 | 14 | 2.1 | 134 | 5.3 |
| 10 (Comp. Ex.) | L  EC STD | EPEG | 10 | 89 | 871 | 42 | 25 | 1.8 | 115 | 5.0 |
| 11 (Comp. Ex.) | M  EC STD | MQ SR 545 | 30 | 90 | 828 | 44 | 11 | 1.6 | 134 | 1.9 |
| 12 (Comp. Ex.) | N  EC STD | Silwet L-7002 | 10 | 89 | 1040 | 44 | 30 | 1.5 | 135 | 4.8 |
| Ref-A (Comp. | —  TAC | N/a | N/a | 81 | 687 | 84 | 12 | 3.7 | 140 | N/a |
| Ref-B (Comp. | —  TAC | N/a | N/a | 41 | >1,200 | 83 | 9 | 3.2 | 156 | N/a |

N/a: not available
*normalized to a film thickness of 80 μm

The high miscibility and strong interaction between polysiloxanes as set forth above as component of the inventive composition and ethyl cellulose is also indicated by the observation of a single $T_g$ and the disappearance of a melting peak characteristic to pure ethyl cellulose for the blend in DSC analysis. The glass transition temperature decreases continuously with increasing amount of the polysiloxane additive (Examples 1-4 and 5-7) and each attains a value between the $T_g$ of pure ethyl cellulose (Comparative Example 9) and the respective polysiloxane ($T_g$ of DC 249: 54° C., $T_g$ of DC Z6018: 56° C., $T_g$ of DC 233: 64° C.). Hence, the addition of a polysiloxane according to the invention can be used to adjust $T_g$ of a cellulosic material or film, e.g. to increase the plasticity and/or to improve the processing properties, similar to the addition of a plasticizer (cf. Comparative Example 10), but without the above-mentioned drawbacks imparted by a plasticizer. Furthermore, the melting enthalpy decreases with increasing amount of the polysiloxane additive (Examples 1 and 5 versus Comparative Example 9). Above 20 wt. % of polysiloxane additive based on the total weight of solids no melting peak can be detected anymore at all (Examples 2-4 and 6-8). Films of ethyl cellulose blends with polysiloxane additives of different structure than those according to the present invention (Comparative Examples 11 and 12) show a glass transition temperature very similar to that of a pure ethyl cellulose film (Comparative Example 9) and exhibit a melting peak likewise to the pure ethyl cellulose film. The different thermal properties evidence significant structural differences between the inventive examples and the comparative examples.

In comparison to a pure ethyl cellulose film (Comparative Example 9) the films comprising a blend of ethyl cellulose and a polysiloxane according to the invention further each polysiloxane (Comparative Example 12) decrease the tensile strength of pure ethyl cellulose already at a comparatively low dosage of 10 wt. % considerably and exhibit also a lower tensile modulus than the films comprising an inventive composition (cf. Inventive Example 1), which thus have a higher mechanical strength and stiffness at comparable additive dosage. Similarly use of a silicone additive based on structural units $[R^1R^2R^3SiO_{0.5}]$ and $[SiO_2]$ (Comparative Example 11) yields blend films having lower tensile modulus, tensile break elongation and break strength compared to films of a blend comprising a polysiloxane according to the invention at the same dosage level (Example 2).

Moreover, the addition of a polysiloxane according to the present invention decreases the water vapor permeation rate continuously with increasing amount of added polysiloxane, e.g. from 1049 g/(m²·day) for a pure 80 μm thick ethyl cellulose film (Comparative Example 9) down to 443 g/(m²·day) for a film of the same thickness comprising 70 wt. % polysiloxane (Example 4). Thus the inventive films can achieve better moisture barrier properties than state of the art TAC protection films (Ref-A) and overcome the intolerably high water vapor permeation rates of pure ethyl cellulose to meet current requirements for protection films in LCD consumer applications, where WVPR values in a range from 400 to 900 g/(m²·day) at 40° C., 90% RH and normalized to 80 μm film thickness are required. Blending a cellulose derivative such as ethyl cellulose with a highly compatible polysiloxane according to the present invention thus enables a flexible and convenient adjustment of the water vapor permeation rate of a cellulosic film. Conventional plasticizers can as well improve the water barrier properties (Comparative Example 10), however, they tend to bleed out especially when used in higher amounts, impairing the long term stability and degrade the mechanical strength. Conventional polysiloxane additives such as the polyether-modified silicone of Comparative Example 12 do not reduce the water vapor permeation at all or not as effective as the polysiloxanes according to the present invention and moreover degrade the optical properties as discussed above. Other polysiloxane additives based on structural units [$R^1R^2R^3SiO_{0.5}$] and [$SiO_2$] (Comparative Example 11) can improve the water barrier properties, however, less effectively than the polysiloxane additives according to the invention at the same dosage level (cf. Example 2) and at the expense of incurring an intolerably high haziness (see above).

Film Post Treatment

The films of Example 2 and Comparative Example 9 were further plasma treated at ambient temperature by exposure to a corona discharge in atmospheric air at a voltage of 98 V and a power of 200 W for 100 seconds in a CTP 1000K plasma device (Nanjing Suman Electronics Co. Ltd.).

Hydrophilic Surface Properties

The water contact angle of the post-treated films was measured using a contact angle test system (Dataphysics OCA 20) comprising a capillary, a programmed movable stage and an optical microscope. A droplet of deionized water having a volume of about 5 μL was each released from the capillary onto the film surface. The contact angle was determined from a microscopic side view by using image analysis software. A commercially available saponified TAC film from Konica Minolta Optics Inc. (Ref-C) was also measured as a reference. Table 5 lists the determined water contact angles.

TABLE 5

Film water contact angle

| Film | Cellulose derivative | Additive | Wt. % additive (based on solids) | Surface treatment | Contact angle before treatment [°] | Contact angle after treatment [°] |
|---|---|---|---|---|---|---|
| 2 (Inv. Ex.) | EC STD 100 | DC 249 | 30 | Corona discharge | 69 | 13 |
| 9 (Comp. Ex.) | EC STD 100 | — | 0 | Corona discharge | 74 | 58 |
| Ref-C (Comp. Ex.) | TAC | N/a | N/a | Saponification | 60 | 30 |

N/a: not available

While the corona treatment of the pure ethyl cellulose film (Comparative Example 9) provided only a minor change in the water contact angle from 74° before the treatment to 58° after the treatment, the same plasma treatment on a film comprising a blend of ethyl cellulose and polysiloxane according to the invention (Example 2) resulted in a drastic reduction of the water contact angle from 69° before the treatment to 13° after the treatment. The incorporated polysiloxane additive thus allows generating hydrophilic surface properties for an inherently hydrophobic cellulosic material or film by plasma treatment. Compared with the commercial saponified TAC film the post-treated inventive film shows a lower water contact angle indicative of a more hydrophilic surface. In particular the plasma treatment of optical films comprising a blend of ethyl cellulose and polysiloxane according to the invention thus represents a fast and effective method to provide ethyl cellulose films having a hydrophilic surface, e.g. corresponding to a water contact angle of 20° C. or less, that yields adequate adhesion to PVA-based layers and adhesives as required for the integration in conventional polarizing plates.

Due to the outstanding combination of physicochemical properties as evidenced by the foregoing examples the films comprising a highly miscible blend of ethyl cellulose and a polysiloxane according to the invention are particularly suited as replacement for state of the art TAC protection and retardation films for LCD applications.

The invention claimed is:

1. A composition comprising a miscible blend of:
   A) at least one cellulose derivative, and
   B) at least one polysiloxane of the formula

wherein the substituents $R^1$, $R^2$, $R^3$, $R^4$, $R^5$ and $R^6$ each independently represent a hydrocarbon group or a functional group selected from the group consisting of hydroxyl groups, acyloxy groups or alkoxy groups, and may be the same or different from each other with respect to each individual silicon atom, and $0 \le a \le 0.4$, $0.01 \le b \le 0.99$, $0.01 \le c \le 0.99$, $0 \le d \le 0.3$, under the proviso that at least one hydrocarbon group and at least one functional group are present and $a+b+c+d=1$.

2. The composition of claim 1, wherein the sum of b+c is in a range from 0.7 to 1 or the ratio c/b is in a range of 5:1 to 1:10.

3. The composition of claim 1, wherein the at least one hydrocarbon group is selected from the group consisting of alkyl, cycloalkyl, aryl and aralkyl groups having 1 to 12 carbon atoms or a mixture of any of the foregoing.

4. The composition of claim 1, wherein a single type of functional group is present, the at least one functional group being a hydroxyl group.

5. The composition of claim 1, wherein the polysiloxane has a weight average molecular weight as measured by gel permeation chromatography using polystyrene standards in the range of 1,000 to 300,000 g/mol.

6. The composition of claim 1, wherein the polysiloxane contains silicon-bound hydroxyl groups in an amount of 0.1 to 15 wt. % based on the total weight of the polysiloxane.

7. The composition of claim 1, wherein the cellulose derivative is a cellulose ether.

8. The composition of claim 1 comprising the at least one polysiloxane in an amount of 0.1 to 90 wt. % and the cellulose derivative in an amount of 10 to 99.9 wt. %, each based on the total weight of solids of the composition.

9. An article comprising a composition as set forth in claim 1.

10. A method of manufacturing an optical film comprising:
  providing a solution comprising at least one cellulose derivative and at least one polysiloxane as set forth in claim 1, and a solvent,
  casting said solution onto a support, and
  drying the cast film at least partially.

11. The method of claim 10 comprising stretching the at least partially dried film mechanically in at least one direction or subjecting the film to a surface treatment.

* * * * *